(12) United States Patent
Cao et al.

(10) Patent No.: US 11,888,294 B2
(45) Date of Patent: *Jan. 30, 2024

(54) POWER DISTRIBUTION DEVICE, POWER DISTRIBUTION TRAILER, ELECTRIC DRIVE SYSTEM AND OPERATION METHOD THEREOF

(71) Applicant: YANTAI JEREH PETROLEUM EQUIPMENT & TECHNOLOGIES CO., LTD., Shandong (CN)

(72) Inventors: Huijuan Cao, Shandong (CN); Yannan Liu, Shandong (CN); Tao Kou, Shandong (CN); Honly Wang, Shandong (CN); Ligong Wu, Shandong (CN); Dekun Tian, Shandong (CN); Libin Zhou, Shandong (CN)

(73) Assignee: YANTAI JEREH PETROLEUM EQUIPMENT & TECHNOLOGIES CO., LTD., Yantai (CN)

( * ) Notice: Subject to any disclaimer, the term of this patent is extended or adjusted under 35 U.S.C. 154(b) by 255 days.

This patent is subject to a terminal disclaimer.

(21) Appl. No.: 17/245,989

(22) Filed: Apr. 30, 2021

(65) Prior Publication Data
US 2022/0294194 A1    Sep. 15, 2022

(30) Foreign Application Priority Data
Mar. 10, 2021  (CN) .......................... 202110260608.8

(51) Int. Cl.
*H02H 7/00*      (2006.01)
*H02B 13/035*    (2006.01)
(Continued)

(52) U.S. Cl.
CPC .......... *H02B 13/035* (2013.01); *H02B 1/202* (2013.01); *H02B 1/30* (2013.01); *H02H 1/0007* (2013.01); *H02H 7/222* (2013.01)

(58) Field of Classification Search
None
See application file for complete search history.

(56) References Cited

U.S. PATENT DOCUMENTS 4,562,360 A * 12/1985 Fujimoto ................. H02B 1/52
                                                     361/603
6,696,925 B1 * 2/2004 Aiello, Jr. ............. H01F 27/002
                                                    340/310.17
(Continued)

FOREIGN PATENT DOCUMENTS

CA    3067854 A1    1/2019
CN   204481493 U    7/2015
(Continued)

*Primary Examiner* — Stephen W Jackson
(74) *Attorney, Agent, or Firm* — XSENSUS LLP (57) ABSTRACT

A power distribution device, a power distribution trailer, an electric drive system and an operation method of the electric drive system are provided, the power distribution device includes: a starting power source, a switchgear room, and a tool room sequentially arranged along a first direction, the switchgear room includes a power inlet-line cabinet and a load feed outlet-line cabinet that are sequentially arranged along the first direction; at least one of the power inlet-line cabinet and the load feed outlet-line cabinet is a gas insulated switch cabinet, a cable terminal of at least one gas insulated switch cabinet is provided with a cable crimping copper bar, the gas insulated switch cabinet is matched with the cable crimping copper bar, a common cold shrinkable terminal connector can be combined with the cable crimping copper bar to realize the connection of an external device to the gas insulated switch cabinet through the cold shrinkable terminal connector.

20 Claims, 5 Drawing Sheets

(51) Int. Cl.
　　　 *H02B 1/20* 　　 (2006.01)
　　　 *H02B 1/30* 　　 (2006.01)
　　　 *H02H 1/00* 　　 (2006.01)
　　　 *H02H 7/22* 　　 (2006.01)

(56) References Cited

U.S. PATENT DOCUMENTS

| | | | |
|---|---|---|---|
| 8,466,385 B1 * | 6/2013 | Glaser | H01H 33/6661 |
| | | | 218/140 |
| 10,519,730 B2 | 12/2019 | Morris et al. | |
| 11,251,650 B1 * | 2/2022 | Liu | F02B 63/047 |
| 2004/0123993 A1 * | 7/2004 | Uchii | B01D 53/02 |
| | | | 174/17.05 |
| 2017/0222409 A1 | 8/2017 | Oehring et al. | |
| 2019/0003329 A1 | 1/2019 | Morris et al. | |
| 2020/0040705 A1 | 2/2020 | Morris et al. | |
| 2020/0087997 A1 | 3/2020 | Morris et al. | |
| 2020/0263527 A1 | 8/2020 | Fischer et al. | |

FOREIGN PATENT DOCUMENTS

| | | |
|---|---|---|
| CN | 210157040 U | 3/2020 |
| CN | 210468801 U | 5/2020 |
| CN | 111541167 A | 8/2020 |
| CN | 111555170 A | 8/2020 |
| CN | 112018880 A | 12/2020 |
| CN | 112103830 A | 12/2020 |
| WO | 2019/006108 A1 | 1/2019 |

* cited by examiner

POWER DISTRIBUTION DEVICE, POWER DISTRIBUTION TRAILER, ELECTRIC DRIVE SYSTEM AND OPERATION METHOD THEREOF

The present application claims the priority of the Chinese Patent Application No. 202110260608.8 filed on Mar. 10, 2021, which is incorporated herein by reference as a part of the present application.

TECHNICAL FIELD

Embodiments of the present disclosure relate to a power distribution device, a power distribution trailer, an electric drive system and an operation method of the electric drive system.

BACKGROUND

With the electrification of well site operation at the present stage, electric energy has gradually replaced other energy sources, and the electric equipment matching with the process also arises at the historic moment, such as the appearance of electric drive fracturing equipment. With the change of power and number of the electrical equipment, there are various requirements for power source configuration, which puts forward new and higher requirements for distribution equipment, such as miniaturization, maintenance free, intelligent, movable and full working condition. In order to meet these requirements, various switch cabinets are constantly emerging. Gas insulated switch cabinet has excellent insulation performance and excellent cooling arc characteristics due to its fully enclosed and gas insulated properties. In the application of electrical equipment, the gas insulated switch cabinet greatly reduces the size and weight of the power distribution device, and improves the safety and reliability of the insulation of the power distribution device, and meet the using requirements in high altitude, humid, dirty and other harsh environmental conditions.

SUMMARY

At least one embodiment of the present disclosure provides a power distribution device, the power distribution device comprises, a starting power source, a switchgear room, and a tool room sequentially arranged along a first direction, the switchgear room comprises a power inlet-line cabinet and a load feed outlet-line cabinet that are sequentially arranged along the first direction; at least one of the power inlet-line cabinet and the load feed outlet-line cabinet is a gas insulated switch cabinet, and a cable terminal of at least one gas insulated switch cabinet is provided with a cable crimping copper bar.

For example, in the power distribution device provided by at least one embodiment of the present disclosure, the power inlet-line cabinet comprises a first power inlet-line cabinet and a second power inlet-line cabinet; and the load feed outlet-line cabinet comprises a first load feed outlet-line cabinet, a second load feed outlet-line cabinet, and a third load feed outlet-line cabinet.

For example, in the power distribution device provided by at least one embodiment of the present disclosure, the first power inlet-line cabinet is the gas insulated switch cabinet, a cable terminal of the first power inlet-line cabinet comprises a first cable terminal and a second cable terminal that are arranged oppositely along a second direction, the first power inlet-line cabinet is configured to be connected to a first power source through the first cable terminal or the second cable terminal, and the second direction is parallel to a plane where the switchgear room is located and is perpendicular to the first direction.

For example, in the power distribution device provided by at least one embodiment of the present disclosure, at least one of the first cable terminal and the second cable terminal is provided with the cable crimping copper bar, and the first power inlet-line cabinet is configured to be electrically connected to the first power source through the cable crimping copper bar.

For example, in the power distribution device provided by at least one embodiment of the present disclosure, the second power inlet-line cabinet is the gas insulated switch cabinet, a cable terminal of the second power inlet-line cabinet comprises a third cable terminal and a fourth cable terminal that are arranged oppositely along the second direction, the second power inlet-line cabinet is configured to be connected to a second power source through the third cable terminal or the fourth cable terminal.

For example, in the power distribution device provided by at least one embodiment of the present disclosure, at least one of the third cable terminal and the fourth cable terminal is provided with the cable crimping copper bar, and the second power inlet-line cabinet is configured to be electrically connected to the second power source through the cable crimping copper bar.

For example, in the power distribution device provided by at least one embodiment of the present disclosure, each of the first load feed outlet-line cabinet, the second load feed outlet-line cabinet, and the third load feed outlet-line cabinet is the gas insulated switch cabinet; each of a cable terminal of the first load feed outlet-line cabinet, a cable terminal of the second load feed outlet-line cabinet, and a cable terminal of the third load feed outlet-line cabinet is provided with the cable crimping copper bar, and is configured to be electrically connected to a load equipment through the cable crimping copper bar.

For example, in the power distribution device provided by at least one embodiment of the present disclosure, the starting power source is configured to provide a spare power source, and provide a starting power source for the first power source and the second power source.

For example, in the power distribution device provided by at least one embodiment of the present disclosure, the starting power source comprises a black starting diesel generator.

For example, the power distribution device provided by at least one embodiment of the present disclosure further comprises at least one of a temperature adjustment component and an alarm component in the switchgear room, the temperature adjustment component is configured to adjust temperature of the switchgear room; and the alarm component is configured to generate an alarm signal in a case where a fire occurs.

For example, in the power distribution device provided by at least one embodiment of the present disclosure, the tool room is a cable storage room.

For example, in the power distribution device provided by at least one embodiment of the present disclosure, the cable storage room has a plurality of cables and a cable reel, the plurality of cables are on a same cable reel, the cable reel is provided with a partition, the partition separates the plurality of cables, and fixes a cable terminal of each of the plurality of cables.

For example, in the power distribution device provided by at least one embodiment of the present disclosure, the cable reel adopts a frequency conversion power device to retract and release the cables.

For example, in the power distribution device provided by at least one embodiment of the present disclosure, a gas filled in the gas insulated switch cabinet is at least one of sulfur hexafluoride and nitrogen.

For example, the power distribution device provided by at least one embodiment of the present disclosure further comprises a bus-line voltage mutual inductor cabinet, the power inlet-line cabinet and the load feed outlet-line cabinet are both provided with a protection relay, and the bus-line voltage mutual inductor cabinet is configured to provide voltage signals to the protection relays of the power inlet-line cabinet and the load feed outlet-line cabinet.

For example, in the power distribution device provided by at least one embodiment of the present disclosure, the protection relay is configured to be connected with a switch or a management machine to realize remote monitoring.

At least one embodiment of the present disclosure further provides a power distribution trailer, the power distribution trailer comprises: the power distribution device according to any one of above embodiments and a movable trailer, the power distribution device is on a bearing surface of the movable trailer.

At least one embodiment of the present disclosure further provides an electric drive system, the electric drive system comprises any one of the power distribution trailers according to the above embodiments, a first power source, and a load equipment, the first power source is on a first side surface of the power distribution trailer, and the load equipment is on a second side surface of the distribution trailer, the first side surface and the second side surface are opposite surfaces.

For example, the electric drive system provided by at least one embodiment of the present disclosure further comprises a second power source, and the second power source is on the movable trailer and on a side of the starting power source away from the switchgear room.

For example, in the electric drive system provided by at least one embodiment of the present disclosure, the load equipment comprises an electric drive fracturing equipment.

At least one embodiment of the present disclosure further provides an operation method of an electric drive system, the electric drive system further comprises a second power source, and the power inlet-line cabinet comprises a first power inlet-line cabinet connected to the first power source, and a second power source inlet-line cabinet connected to the second power source, the first power source comprises a first generator outlet switch and a first synchronization device, the first power inlet-line cabinet comprises a first power inlet-line circuit breaker, and the second power source comprises a second generator outlet switch and a second synchronization device, the second power inlet-line cabinet comprises a second power inlet-line circuit breaker, the operation method comprises: allowing at least one of the first power source and the second power to operate, in a case where only the first power source operates: allowing the first generator outlet switch to be in an open state, closing the first power inlet-line circuit breaker, and then closing the first generator outlet switch synchronously through the first synchronous device.

For example, in the operation method provided by at least one embodiment of the present disclosure, in a case where only the second power source operates: allowing the second generator outlet switch to be in an open state, closing the second power inlet-line circuit breaker, and then closing the second generator outlet switch synchronously through the second synchronous device.

For example, in the operation method provided by at least one embodiment of the present disclosure, in a case where both the first power source and the second power source operate: connecting a close state of the first power inlet-line circuit breaker in series with a close circuit of the first generator outlet switch, and connecting an open state of the first generator outlet switch in series with a close circuit of the first power inlet-line circuit breaker; and connecting a close state of the second power inlet-line circuit breaker in series with a close circuit of the second generator outlet switch, and connecting an open state of the second generator outlet switch in series with a close circuit of the second power inlet-line circuit breaker.

For example, in the operation method provided by at least one embodiment of the present disclosure, in a case where both the first power source and the second power source operate normally, and the first power source suddenly stops operating: performing a protection fault action to jump the first power inlet-line circuit breaker first, after the fault is resolved, allowing the first power source to be parallel to a bus line of the power distribution device, separating the first generator outlet switch, closing the first power inlet-line circuit breaker, and closing the first generator outlet switch synchronously through the first synchronization device; or, performing a protection fault action to jump the first generator outlet switch, after the fault is resolved, allowing the first power source to be parallel to a bus line of the power distribution device, and closing the first generator outlet switch synchronously through the first synchronization device.

For example, in the operation method provided by at least one embodiment of the present disclosure, in a case where both the first power source and the second power source operate normally, and the second power source suddenly stops operating: performing a protection fault action to jump the second power inlet-line circuit breaker first, after the fault is resolved, allowing the second power source to be parallel to a bus line of the power distribution device, separating the second generator outlet switch, closing the second power inlet-line circuit breaker, and closing the second generator outlet switch synchronously through the second synchronization device; or, performing a protection fault action to jump the second generator outlet switch, after the fault is resolved, allowing the second power source to be parallel to a bus line of the power distribution device, and closing the second generator outlet switch synchronously through the second synchronization device.

For example, in the operation method provided by at least one embodiment of the present disclosure, the load equipment comprises a first load equipment and a second load equipment, and the load feed outlet-line cabinet comprises a first load feed outlet-line cabinet, a second load feed outlet-line cabinet, and a third load feed outlet-line cabinet, the first load equipment is connected to a circuit in the first load feed outlet-line cabinet, the second load device is connected to a circuit in the second load feed outlet-line cabinet, and the third load feed outlet-line cabinet is a spare load feed outlet-line cabinet, in a case where the first load feed outlet-line cabinet has a fault, the first load equipment is connected to a circuit in the third load feed outlet-line cabinet; or, in a case where the second load feed outlet-line cabinet has a fault, the second load equipment is connected to the circuit in the third load feed outlet-line cabinet.

BRIEF DESCRIPTION OF THE DRAWINGS

In order to clearly illustrate the technical solution of the embodiments of the present disclosure, the drawings of the embodiments will be briefly described in the following. It is obvious that the described drawings in the following are only related to some embodiments of the present disclosure and thus are not limitative of the present disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", "coupled", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

In the field of oil exploitation, a movable power distribution device is usually used in a well site to distribute electric energy to an electrical equipment in the well site, and the power distribution device needs to be placed on a movable trailer. The power distribution device includes a medium voltage switch cabinet, the medium voltage switch cabinet includes an air insulated switch cabinet and a gas insulated switch cabinet. A volume of the air insulated switch cabinet is relatively large. Due to the limitation of a carrying space of the movable trailer, an operation space of the medium voltage switch cabinet is greatly limited, so it is necessary to provide an operation space separately. For example, an operation platform is installed on a side of the movable trailer, but when working in different well sites, the corresponding operation platform needs to be connected, which makes the operation process more complicated. In addition, many well sites are located in plateau environment, which has the characteristics of low air pressure, low temperature, large temperature difference between day and night, low absolute humidity and strong sunshine, which will have a great impact on the insulation, temperature rise and arc extinguishing of the electrical equipment. Moreover, in plateau environment, the electrical equipment is also prone to aging. A volume of the gas insulated switch cabinet is relatively small, which occupies a small bearing area of the movable trailer. Moreover, after the gas insulated switch cabinet is placed on the movable trailer, according to a size of the current movable trailer, there is enough operation space in front of the cabinet, so as to make the power distribution device highly integrated, flexible and convenient. In addition, due to a special insulation mode of the gas insulated switch cabinet, the service environment of the gas insulated switch cabinet is not affected by altitude, and it can be applied to the working environment of various altitudes. Therefore, the gas insulated switch cabinet is usually used as the power distribution device to distribute electric energy to the electrical equipment in the well site.

For example, due to the uncontrollability of outdoor environment, the hardening degree of well site ground is also different. An input terminal and an output terminal of the gas insulated switch cabinet usually adopt a combination of a T-type cable connector and a T-type plug. However, the T-type cable connector needs to be coated with grease when it is plugged in and out, and the requirement for environmental cleanliness is relatively high when it is installed again. Otherwise, it is difficult to be cleaned when the dust enters the internal portion of the T-type plug, the residual dust may cause arc discharge of the T-type cable connector, which has potential safety hazard. Moreover, in the process of transporting the power distribution device, it is difficult to fix the T-type cable connector, and the T-type cable connector is easy to be damaged. When selecting the equipment, a special terminal adapter should be used to connect to the terminal of the gas insulated switch cabinet, the inventors of the present disclosure have found that the T-type cable connector of the gas insulated switch cabinet can be changed into a common cable crimping copper bar through an adapter, and then a common cold shrinkable terminal connector can be combined with the cable crimping copper bar to finally realize the connection of an external device to the gas insulated switch cabinet through the cold shrinkable terminal connector, so as to solve the problem of coating grease when plugging in and plugging out of the T-type connector in the well site, having high requirements for environmental cleanliness, having difficulties to be fixed and being easy to be damaged during transportation.

Figure 1:
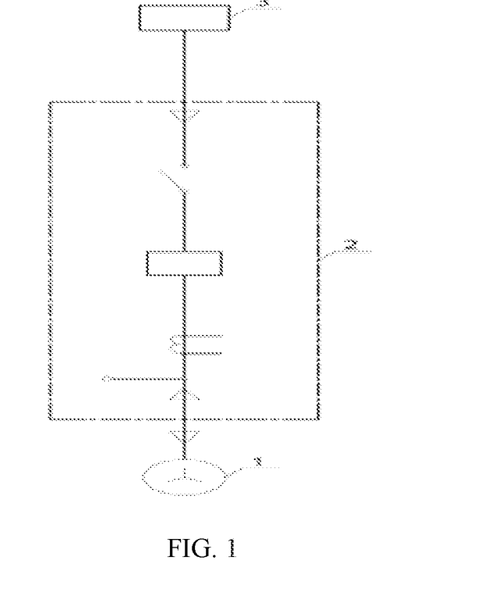
FIG. 1 is diagram showing an operation mode of a single unit.

In addition, in the conventional design of the well site operation, the power distribution device is directly connected with a single power source, and then connected to a load equipment such as an electric drive fracturing equipment to form a single unit operation mode. For example, FIG. 1 shows an operation mode of a single unit, as shown in FIG. 1, an external power source 1 is connected to a power distribution cabinet 2, and the power distribution cabinet 2 is connected to a load equipment 3 to form the single unit operation mode. However, the single power source mode in FIG. 1 can no longer work normally when having any one of the following problems: (1) the external power source 1 has a fault, for example, a gas turbine generator or a diesel generator has a fault, or a power grid is cut off; (2) a circuit in the distribution cabinet 2 has a fault; (3) the load equipment 3 has a fault.

For example, at least one embodiment of the present disclosure provides a power distribution device, the power distribution device includes a starting power source, a switchgear room, and a tool room sequentially arranged along a first direction. The switchgear room includes a power inlet-line cabinet and a load feed outlet-line cabinet that are sequentially arranged along the first direction; at least one of the power inlet-line cabinet and the load feed outlet-line cabinet is a gas insulated switch cabinet, and a cable terminal of at least one gas insulated switch cabinet is provided with a cable crimping copper bar. In this power distribution device, a common cold shrinkable terminal connector can be combined with the cable crimping copper bar, so that an external power source or a load equipment can be connected to the gas insulated switch cabinet through the common cold shrinkable terminal connector, so as to solve the problems of coating grease when plugging in and plugging out of the T-type connector in the well site, having high requirements for environmental cleanliness, having difficulties to be fixed and being easy to be damaged during transportation.

For example, the gas insulated switch cabinet is a fully enclosed gas insulated electrical equipment, which includes a circuit breaker, a disconnecting switch, a grounding switch, a mutual inductor, a lightning arrester, a bus line, a connector and an outlet-line terminal, etc. The above components are all enclosed in a metal cabinet, and a certain pressure of insulating gas is filled in the inner of the metal cabinet.

It should be noted that, the switchgear room may also include a bus-line voltage mutual inductor cabinet, along the first direction, the power inlet-line cabinet, the load feed outlet-line cabinet and the bus-line voltage mutual inductor cabinet are arranged in sequence. The bus-line voltage mutual inductor cabinet may also be a gas insulated switch cabinet. In some embodiments, the components in the bus-line voltage mutual inductor cabinet may also be disposed in the power inlet-line cabinet or the load feed outlet-line cabinet, so there is no need to set a bus-line voltage mutual inductor cabinet separately.

Figure 2:
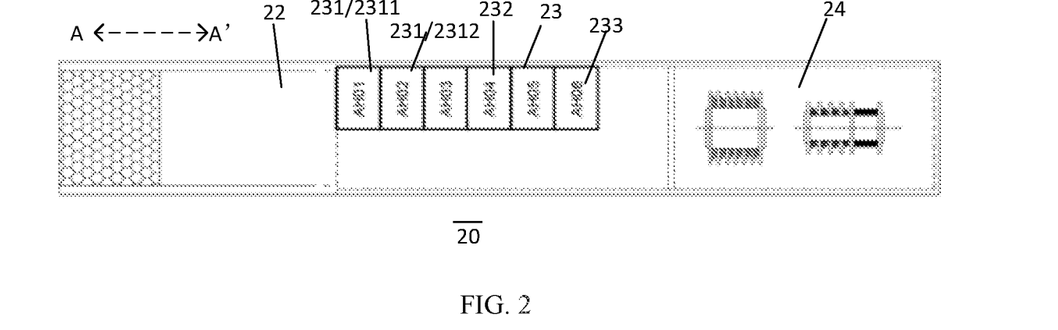
FIG. 2 is a structural schematic diagram of a power distribution device provided by an embodiment of the present disclosure.

For example, FIG. 2 is a structural schematic diagram of a power distribution device provided by an embodiment of the present disclosure. For example, a case that the switchgear room includes a power inlet-line cabinet, a load feed outlet-line cabinet and a bus-line voltage mutual inductor cabinet which are arranged along the first direction in sequence is taken as an example to illustrate in FIG. 2. For example, as shown in FIG. 2, the power distribution device 20 can be arranged on a movable trailer, along the first direction A-A', that is, along a direction from the rear of the movable trailer to the front of the movable trailer, the power distribution device 20 includes: a starting power source 22, a switchgear room 23, and a tool room 24 sequentially. The switchgear room 23 includes a power inlet-line cabinet 231, a load feed outlet-line cabinet 232 and a bus-line voltage mutual inductor cabinet 233 that are sequentially arranged along the first direction. At least one of the power inlet-line cabinet 231, the load feed outlet-line cabinet 232 and the bus-line voltage mutual inductor cabinet is a gas insulated switch cabinet, and a cable terminal of at least one gas insulated switch cabinet is provided with a cable crimping copper bar.

For example, the starting power source 22 includes a black starting diesel generator or the like. The black starting refers to that after a whole system is shut down due to fault, the system is in a "black" state, and it does not rely on the help of other networks, by starting the generator set with self starting ability in the system, the generator set with self starting ability drives the generator set without self starting ability, gradually expands the scope of system recovery, and finally realizes the recovery of the whole system. As an auxiliary equipment, the black starting has the advantages of simple structure, less auxiliary power and fast start-up speed.

For example, as shown in FIG. 2, the power inlet-line cabinet 231 includes a first power inlet-line cabinet 2311 and a second power inlet-line cabinet 2312 to ensure that two external power sources (a first power source and a second power source) can be connected to the switchgear room 23 through the first power inlet-line cabinet 2311 and the second power inlet-line cabinet 2312, respectively.

It should be noted that the power inlet-line cabinet 231 may also include more power inlet-line cabinets in addition to the first power inlet-line cabinet 2311 and the second power inlet-line cabinet 2312, and there is no limitation herein.

For example, as shown in FIG. 2, the starting power source 22, the first power inlet-line cabinet 2311 and the second power inlet-line cabinet 2312 are adjacent to each other in sequence, which can shorten the length of the cable, and they can be laid along a same path, thereby reducing the cost of laying.

For example, when the starting power source 22 is a black starting diesel generator, the starting power source 22 is configured to provide a spare power source and provide a starting power source for the first power source and the second power source.

For example, when the external power source such as the first power source or the second power source has a fault, the starting power source 22 can provide power for auxiliary machines such as ventilation and lubricating oil systems, so as to be used as a spare power source.

Figure 3A:
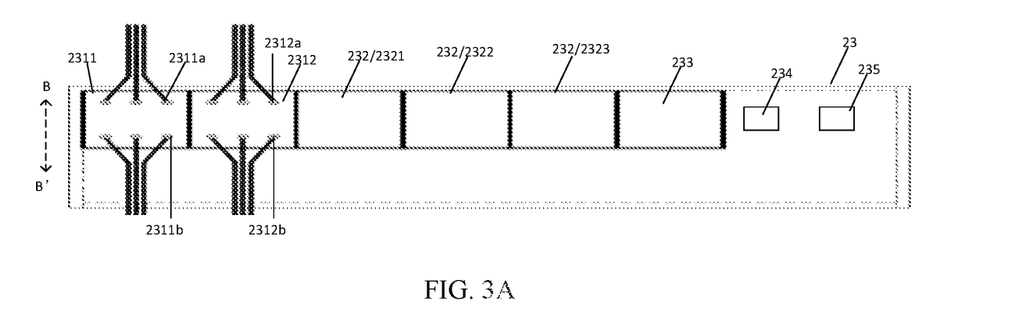
FIG. 3A is a structural schematic diagram of a cable terminal of a gas insulated switch cabinet provided by an embodiment of the present disclosure.

For example, FIG. 3A is a structural schematic diagram of a cable terminal of a gas insulated switch cabinet provided by an embodiment of the present disclosure. Referring to FIG. 2 and FIG. 3A, the first power inlet-line cabinet 2311 is a gas insulated switch cabinet, along a second direction B-B', the cable terminal of the first power inlet-line cabinet 2311 includes a first cable terminal 2311a and a second cable terminal 2311b that are oppositely arranged, and the first power inlet-line cabinet 2311 is configured to be connected to the first power source through the first cable terminal 2311a or the second cable terminal 2311b. The second direction B-B' is parallel to a plane on which the switchgear room 23 is located and perpendicular to the first direction A-A'.

For example, the first power source can be connected with the first power inlet-line cabinet 2311 through the first cable terminal 2311a or the second cable terminal 2311b, that is, both the first cable terminal 2311a and the second cable terminal 2311b are connected to the first power inlet-line cabinet 2311. When the first power source is connected to the first power inlet-line cabinet 2311 through the first cable terminal 2311a, it is ensured that current will not be input to the first power inlet-line cabinet 2311 through the second cable terminal 2311b; when the first power source is connected to the first power inlet-line cabinet 2311 through the second cable terminal 2311b, it is ensured that current will not be input to the first power inlet-line cabinet 2311 through the first cable terminal 2311a.

For example, along the second direction B-B', that is, in the direction parallel to the plane on which the switchgear room 23 is located and perpendicular to a straight line from the starting power source 22 to the tool room 24, the first cable terminal 2311a and the second cable terminal 2311b are oppositely arranged on the first power inlet-line cabinet 2311, so that according to the change of the position of the first power source, it is ensured that the cable on the inlet-line side of the first power source does not pass through the bottom of the power distribution device, so that the length of the cable will be shortened to better realize the electrical connection, and the power distribution device can be placed smoothly.

For example, the first power source includes a power grid, a diesel generator set, a gas turbine generator set, or other devices or equipments that provide electrical energy.

For example, as shown in FIG. 3A, at least one of the first cable terminal 2311a and the second cable terminal 2311b is provided with the cable crimping copper bar. When both the first cable terminal 2311a and the second cable terminal 2311b are provided with the cable crimping copper bars, the first power inlet-line cabinet 2311 is electrically connected to the first power source through the cable crimping copper bar of the first cable terminal 2311a or the cable crimping copper bar of the second cable terminal 2311b.

For example, as shown in FIG. 3A, the second power inlet-line cabinet 2312 is the gas insulated switch cabinet, and along the second direction B-B', the cable terminal of the second power inlet-line cabinet 2312 include a third cable terminal 2312a and a fourth cable terminal 2312b that are oppositely arranged, and the second power inlet-line cabinet 2312 is configured to be connected to the second power source through the third cable terminal 2312a or the fourth cable terminal 2312b.

For example, the second power source can be connected to the second power inlet-line cabinet 2312 through the third cable terminal 2312a or the fourth cable terminal 2312b, that is, the third cable terminal 2312a and the fourth cable terminal 2312b are both connected to the second power inlet-line cabinet 2312. When the second power source is connected to the second power inlet-line cabinet 2312 through the third cable terminal 2312a, it is ensured that current will not be input to the second power inlet-line cabinet 2312 through the fourth cable terminal 2312b; and when the second power source is connected to the second power inlet-line cabinet 2312 through the fourth cable terminal 2312b, it is ensured that current will not be input to the second power inlet-line cabinet 2312 through the third cable terminal 2312a.

For example, along the second direction B-B', the third cable terminal 2312a and the fourth cable terminal 2312b are oppositely arranged on the second power inlet-line cabinet 2312. In this way, according to the change of the position of the second power source, it is ensured that the cable on the inlet-line side of the second power source does not pass through the bottom of the power distribution device, so that the length of the cable is shortened to better realize the electrical connection, and the power distribution can be placed smoothly.

For example, the second power source may include a power grid, a diesel generator set, a gas turbine generator set, or other devices or equipments that provide electrical energy.

For example, when the first power source has a fault, in order to ensure the sequence shutdown of the operation process, the second power source can also be incorporated under the condition of concurrent parallel.

For example, as shown in FIG. 3A, at least one of the third cable terminal 2312a and the fourth cable terminal 2312b is provided with the cable crimping copper bar. When both the third cable terminal 2312a and the fourth cable terminal 2312b are provided with cable crimping copper bars, the second power inlet-line cabinet 2312 is configured to be electrically connected with the second power source through the cable crimping copper bar of the third cable terminal 2312a or the cable crimping copper bar of the fourth cable terminal 2312b.

For example, as shown in FIG. 3A, the load feed outlet-line cabinet 232 includes a first load feed outlet-line cabinet 2321, a second load feed outlet-line cabinet 2322 and a third load feed outlet-line cabinet 2323.

It should be noted that, the load feed out outlet-line cabinet 232 may also include more load feed outlet-line cabinets in addition to the first load feed outlet-line cabinet 2321, the second load feed outlet-line cabinet 2322 and the third load feed outlet-line cabinet 2323, which is not limited herein.

For example, the first load feed outlet-line cabinet 2321, the second load feed outlet-line cabinet 2322 and the third load feed outlet-line cabinet 2323 are all gas insulated switch cabinets, and at least one of the cable terminal of the first load feed outlet-line cabinet 2321, the cable terminal of the second load feed outlet-line cabinet 2322 and the cable terminal of the third load feed outlet-line cabinet 2323 is provided with the cable crimping copper bar.

For example, in one example, the cable terminal of the first load feed outlet-line cabinet 2321, the cable terminal of the second load feed outlet-line cabinet 2322, and the cable terminal of the third load feed outlet-line cabinet 2323 are all provided with the cable crimping copper bars. The first load feed outlet-line cabinet 2321, the second load feed outlet-line cabinet 2322 and the third load feed outlet-line cabinet 2323 are respectively configured to be electrically connected with the load equipment 232 through the cable crimping copper bars.

For example, when there is only one load equipment, any one of the first load feed outlet-line cabinet 2321, the second load feed outlet-line cabinet 2322 and the third load feed outlet-line cabinet 2323 may be connected to the load equipment, the unconnected load feed outlet-line cabinets are used as spare load feed outlet-line cabinets. When the connected load feed outlet-line cabinet has a fault, the load equipment can be connected with any one of the spare load feed outlet-line cabinets.

For example, when there is two load equipments, any two of the first load feed outlet-line cabinet 2321, the second load feed outlet-line cabinet 2322 and the third load feed outlet-line cabinet 2323 may be connected to the load equipments, the unconnected load feed outlet-line cabinet is used as a spare load feed outlet-line cabinet. When one of the connected load feed outlet-line cabinet has a fault, the load equipment can be connected with the spare load feed outlet-line cabinet.

For example, as shown in FIG. 3A, the power distribution device 20 further includes a temperature adjustment component 234 arranged in the switchgear room 23, the temperature adjustment component 234 is configured to adjust the temperature of the switchgear room 23. If there is no temperature adjustment component 234 in the switchgear room 23, when the power distribution device 20 is in the high temperature environment in summer, the switchgear room 23 can only be used by reducing the capacity, and the temperature adjustment component 234 can ensure that the temperature in the switchgear room is maintained in a constant and appropriate range, so as to ensure that the switchgear room 23 will not be affected by the temperature rise, and will not cause the capacity of switchgear room to be reduced.

For example, the power distribution device 20 further includes an alarm component 235 in the switchgear room 23, the alarm component 235 is configured to send an alarm signal when fire occurs. In case of fire, a instrument skid or a manned control room can receive a fire alarm signal at the first time, and deal with the emergency accident in time.

Figure 3B:
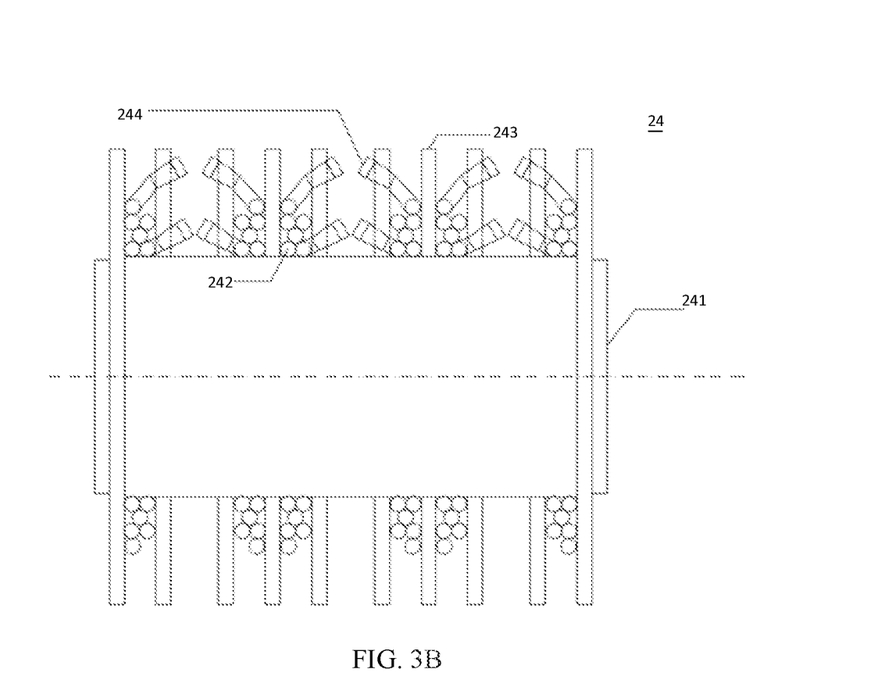
FIG. 3B is a structural schematic diagram of a tool room provided by an embodiment of the present disclosure.

For example, FIG. 3B is a structural schematic diagram of a tool room provided by an embodiment of the present disclosure. As shown in FIG. 3B, the tool room 24 is a cable storage room. The cable storage room has a plurality of cables 242 and a cable reel 241. For example, there are six groups of cables in FIG. 3B. The plurality of cables 242 are arranged on the same cable reel 241, and at least one partition 243 is arranged on the cable reel 241, for example, there are ten partitions in FIG. 3B. The partitions 243 separate the plurality of cables 242 and fixes the cable terminals 244 of the plurality of cables 242, respectively. For example, in FIG. 3B, six groups of cables are respectively located in the storage regions defined by the partitions, and there is a space region between two adjacent groups of cables, the space region is convenient for fixing the cable terminals 244 of the plurality of cables 242 on the partitions 243.

For example, the cable reel 241 adopts a frequency conversion power device to retract and release the cables 242, so as to control the speed of retracting and releasing the cables 242.

For example, the gas filled in the gas insulated switch cabinet is at least one of sulfur hexafluoride ($SF_6$) and nitrogen ($N_2$). When the gas filled in the gas insulated switch cabinet is only $SF_6$, the high-purity $SF_6$ gas has good insulation and arc extinguishing performance, which ensures the breaking capacity and safety of the gas insulated switch cabinet.

Figure 4:
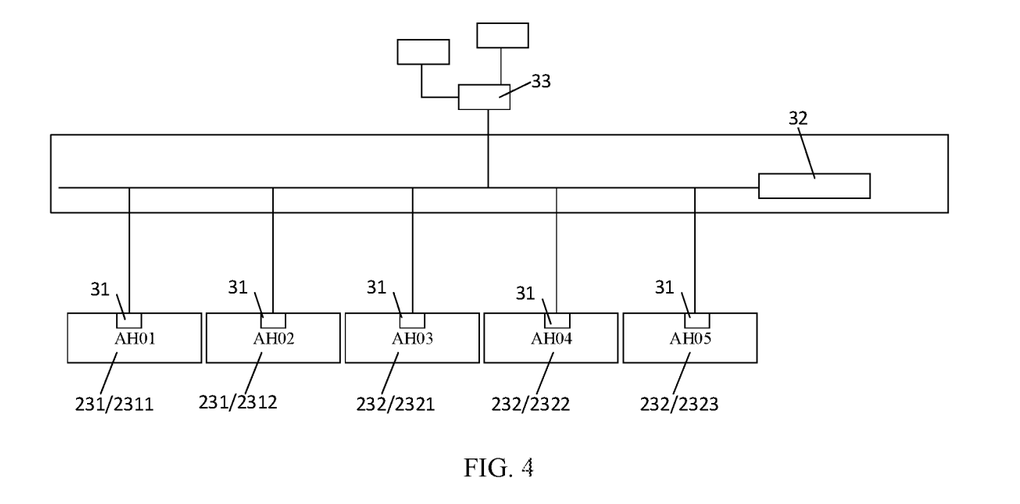
FIG. 4 is a schematic diagram of a remote device provided by an embodiment of the present disclosure.

For example, FIG. 4 is a schematic diagram of a remote device provided by an embodiment of the present disclosure. The power inlet-line cabinet 231 (including the first power inlet-line cabinet 2311 and the second power inlet-line cabinet 2312) and the load feed outlet-line cabinet 232 (including the first load feed outlet-line cabinet 2321, the second load feed outlet-line cabinet 2322 and the third load feed outlet-line cabinet 2323) are both provided with protection relays 31, and the bus-line voltage mutual inductor cabinet 233 is configured to provide voltage signals for the protection relay 31 of the power inlet-line cabinet 231 and the protection relay 31 of the load feed outlet-line cabinet 232. The protection relays 31 have the protection functions of quick break, over-current, overload, over-voltage, etc. Current signals required for the protection relays 31 come from the current mutual inductors in the power inlet-line cabinet 231 and the load fed outlet-line cabinet 232. The voltage signals are from the bus-line voltage mutual inductor, and the protection relays 31 judge whether the corresponding circuit is normal by detecting the normal state or abnormal state of the incoming current and voltage signal. In case of failure, the protection relays 31 send out a tripping signal to open the circuit breaker, thus cutting off the fault circuit, ensuring the normal operation of the non-fault circuit or preventing the expansion of the accident scope, so as to protect the connecting equipment.

For example, the protection relays 31 in the power inlet-line cabinet 231 and the protection relays 31 in the load feed outlet-line cabinet 232 are connected with a switch 32 or a management machine 33 to realize remote monitoring. The specific process is as follows: each of the protection relays 31 is equipped with a communication interface of RJ45 or a communication interface of RS485, the communication interface of RJ45 of each of the protection relays 31 is connected to the switch 32 through the network cable, or each of the protection relays 31 is connected to a management machine 33 through the communication interface of RS485, and then each of the protection relays 31 is connected with a PLC device or a microcomputer monitoring device to realize the remote monitoring and controlling of the power inlet-line cabinet 231 and the load feed outlet-line cabinet 232, thereby realizing the function of unattended.

For example, the distribution device adopts a single bus line mode or a single bus line breaking mode to realize the function of confluence and distribution of electric energy.

For example, the power distribution device 20 can be used for the connection between the medium voltage electrical equipment and the external power source in the oil field well site operation. The external power source may be various devices or equipments providing electric energy, such as a power grid, a gas turbine generator, a diesel generator, etc. The power distribution device 20 can be used in the electric drive fracturing site, or the oil field well site of electrification operation.

Figure 5:
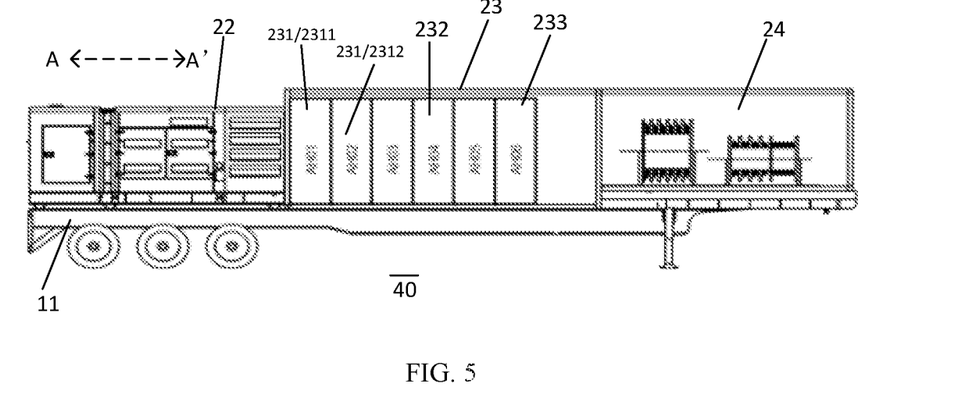
FIG. 5 is a structural schematic diagram of a power distribution trailer provided by an embodiment of the present disclosure.

An embodiment of the present disclosure further provides a power distribution trailer, for example, FIG. 5 is a structural schematic diagram of a power distribution trailer provided by an embodiment of the present disclosure, as shown in FIG. 5, the power distribution trailer 40 includes a movable trailer and any one of the power distribution device 20 according to the above embodiments, the power distribution device 20 is arranged on a bearing surface of the movable trailer 11. Along a direction from the rear of the movable trailer 11 to the front of the movable trailer 11, that is, along the first direction A-A', the power distribution device 20 includes: a starting power source 22, a switchgear room 23, and a tool room 24 in sequence, the switchgear room 23 includes a power inlet-line cabinet 231 and a load feed outlet-line cabinet 232 that are sequentially arranged along the first direction. At least one of the power inlet-line cabinet 231 and the load feed outlet-line cabinet 232 is the gas insulated switch cabinet, and a cable terminal of at least one of the gas insulated switch cabinet is provided with a cable crimping copper bar.

It should be noted that, the switchgear room 23 may also include a bus-line voltage mutual inductor cabinet 233, along the first direction A-A', the power supply inlet-line cabinet 231, the load feed outlet-line cabinet 232 and the bus-line voltage mutual inductor cabinet 233 are arranged in sequence. The bus-line voltage mutual inductor cabinet 233 may also be a gas insulated switch cabinet. In some embodiments, the components in the bus-line voltage mutual inductor cabinet 233 may also be arranged in the power inlet-line cabinet 231 or in the load feed outlet-line cabinet 232, so there is no need to set a bus-line voltage mutual inductor cabinet separately.

For example, since the starting power source 22 has large weight, less external wiring, and does not need to be moved frequently, the starting power source 22 can be placed directly above a wheel near the rear of the movable trailer 11. Generally, the tool room 24 is light and usually has cable reels, the cables are arranged on the cable reels, and the tool room 24 is arranged on the head of the movable trailer 11 to facilitate the connection of the cables with the external equipment. The switchgear room 23 is arranged between the starting power source 22 and the tool room 24, which is convenient for inlet-line and outlet-line wiring lines. The power distribution device 20 takes into account the convenience of use and the weight distribution.

Figure 6:
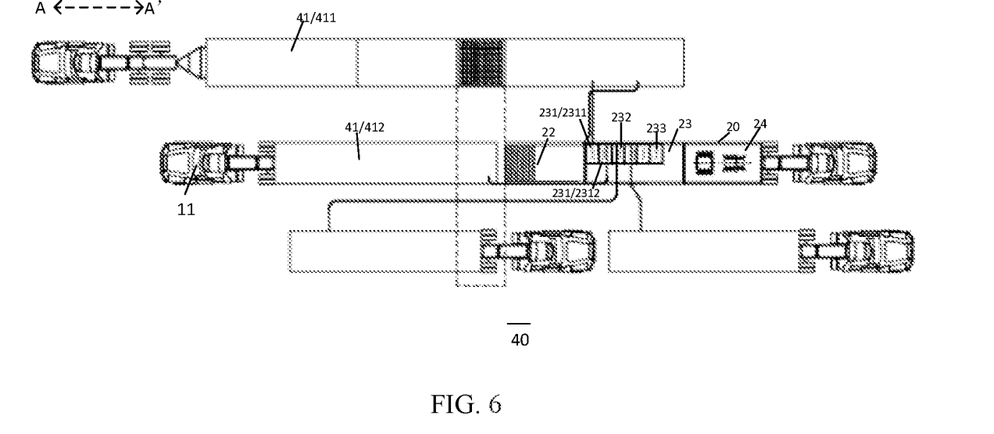
FIG. 6 is a structural schematic diagram of an electric drive system provided by an embodiment of the present disclosure.

An embodiment of the present disclosure further provides an electric drive system, for example, FIG. 6 is a structural schematic diagram of an electric drive system provided by an embodiment of the present disclosure, as shown in FIG. 6, the electric drive system 50 includes any one of the power distribution trailers 40 according to the above embodiments, a first power source 411, and a load equipment 42, the power distribution device 20 is arranged on a bearing surface of the movable trailer 11. The first power source 411 is on a first side surface of the power distribution trailer 40, and the load equipment 42 is on a second side surface of the distribution trailer 40, the first side surface and the second side surface are opposite surfaces.

For example, along an extension direction of the bearing surface of the power distribution trailer 40, that is, along the direction from the starting power source 22 to the tool room 24, the first side surface of the power distribution trailer 40 is the left side of the bearing surface of the power distribution trailer 40, and the second side surface of the power distribution trailer 40 is the right side of the bearing surface of the power distribution trailer 40. For example, the electric drive system further includes a second power source 412, the second power source 412 is located on the movable trailer 11 and on a side of the starting power source 22 away from the switchgear room 23.

For example, the above configuration of the electric drive system 50 can make the structure of the electric drive system 50 more compact to reduce the length of the cable used.

It should be noted that, the first power source 411 and the load equipment 42 may also be located on a same side of the power distribution trailer 40, which is not limited herein.

For example, as shown in FIG. 6, the first power source 411 and the second power source 412 may be respectively devices or equipments that provide electric energy, such as power grids, gas turbine generators, diesel generators, or the like. The following will take the first power source 411 as a gas turbine generator and the second power source 412 as a diesel generator as examples.

For example, the load equipment 42 may include a first load equipment 421 and a second load equipment 422. The first loading equipment 421 and the second load equipment 422 may both be electric drive fracturing devices or the like.

For example, along a direction from the rear of the movable trailer 11 to the front of the movable trailer 11, that is, along the first direction A-A', the power distribution device 20 includes in sequence: a starting power source 22, a switchgear room 23, and a tool room 24, the switchgear room 23 includes a power inlet-line cabinet 231, a load feed outlet-line cabinet 232 and a bus-line voltage mutual inductor cabinet 233 that are sequentially arranged along the first direction. At least one of the power inlet-line cabinet 231, the load feed outlet-line cabinet 232 and the bus-line voltage mutual inductor cabinet 233 is a gas insulated switch cabinet, and a cable terminal of at least one of the gas insulated switch cabinet is provided with a cable crimping copper bar. The power source 41 is configured to be electrically connected with the power inlet-line cabinet 231.

For example, in a general structure of the electric drive system, the T-type cable connector and T-type plug of the gas insulated switch cabinet are usually combined. The inventors of the present disclosure note that the gas insulated switch cabinet adopts the T-type cable connector, and the air insulated switchgear adopts the cable crimping copper bar cable connector, the width of the gas insulated switch cabinet is much smaller than that of the air insulated switch cabinet, and the equipment is usually completely installed at one time, it does not need to be disassembled frequently, and the using environment is relatively clean, however, the operation condition of the well site requires frequent installation and disassembly, and the external environment is mostly dust and gravel, so that the T-type cable connector can not meet such requirements. Therefore, the common cold shrinkable terminal connector can be combined with the cable crimping copper bar, and the T-type cable connector can be changed to the cable crimping copper bar through the cable terminal adapter in the gas insulated switch cabinet, so that the external power source or the load equipment can be connected to the gas insulated switch cabinet through the common cold shrinkable terminal connector, so as to solve the problem of coating grease when plugging in and plugging out of the T-type connector in the well site, having high requirements for environmental cleanliness, having difficulties to be fixed and being easy to be damaged during transportation.

For example, as shown in FIG. 6, the power inlet-line cabinet 231 includes a first power inlet-line cabinet 2311, the first power inlet-line cabinet 2311 is the gas insulated switch cabinet, and the power source 41 includes a first power source 411. Referring to FIG. 3A and FIG. 6, along the second direction B-B', which is parallel to a plane on which the switchgear room 20 is located and is perpendicular to the first direction A-A', the cable terminal of the first power inlet-line cabinet 2311 includes a first cable terminal 2311a and a second cable terminal 2311b that are arranged oppositely, and the first power inlet-line cabinet 2311 is connected to the first power source 411 through the first cable terminal 2311a or the second cable terminal 2311b.

For example, as shown in FIG. 3A and FIG. 6, at least one of the first cable terminal 2311a and the second cable terminal 2311b is provided with the cable crimping copper bar, and the first power inlet-line cabinet 2311 is electrically connected to the first power source 411 through the cable crimping copper bar.

For example, as shown in FIG. 3A and FIG. 6, the power inlet-line cabinet 231 further includes a second power inlet-line cabinet 2312, and the second power inlet-line cabinet 2312 is the gas insulated switch cabinet. Along the second direction B-B', the cable terminal of the second power inlet-line cabinet 2312 includes a third cable terminal 2312a and a fourth cable terminal 2312b that are arranged oppositely, and the second power inlet-line cabinet 2312 is configured to be connected to the second power source 412 through the third cable the terminal 2312a or the fourth cable terminal 2312b.

For example, as shown in FIG. 3A and FIG. 6, at least one of the third cable terminal 2312a and the fourth cable terminal 2312b is provided with a cable crimping copper bar, and the second power inlet-line cabinet 2312 is electrically connected to the second power source 412 through the cable crimping copper bar.

For example, as shown in FIG. 3A and FIG. 6, the load feed outlet-line cabinet 232 includes a first load feed outlet-line cabinet 2321, a second load feed outlet-line cabinet 2322 and a third load feed outlet-line cabinet 2323. The first load feed outlet-line cabinet 2321, the second load feed outlet-line cabinet 2322 and the third load feed outlet-line cabinet 2323 are all the gas insulated switch cabinets, and the cable terminal of the first load feed outlet-line cabinet 2321, the cable terminal of the second load feed outlet-line cabinet 2323 and the cable terminal of the third load feed outlet-line cabinet 2322 are all provided with cable crimping copper bars, and are respectively configured to be electrically connected with the load equipment 42 through the cable crimping copper bars.

For example, the gas insulated switch cabinet is a fully enclosed gas insulated electrical equipment, which includes a circuit breaker, a disconnecting switch, a grounding switch, a mutual inductor, a lightning arrester, a bus line, a connector and an outlet-line terminal, etc. The above parts are all enclosed in a grounded metal cabinet, and the metal cabinet is filled with insulating gas of certain pressure.

For example, other related structures of the power distribution device in the electric drive system can refer to the related descriptions of the above power distribution device, which will not be repeated here. The power distribution device in the electric drive system may also include an alarm component, a temperature adjustment component and a remote monitoring component.

For example, at least one embodiment of the present disclosure further provides an operation method of an electric drive system, the electric drive system further includes a second power source 412, and the power inlet-line cabinet 231 includes a first power inlet-line cabinet 2311 connected to the first power source 411, and a second power source inlet-line cabinet 2312 connected to the second power source 412, the first power source 411 includes a first generator outlet switch 52G1 and a first synchronization device 251, the first power inlet-line cabinet 2311 includes a first power inlet-line circuit breaker 51M1, and the second power source 412 includes a second generator outlet switch 52G2 and a second synchronization device 252, the second power inlet-line cabinet 2312 includes a second power inlet-line circuit breaker 52M2, the operation method includes: allowing at least one of the first power source 411 and the second power 412 to operate. For example, the first power source 411 is connected to a circuit in the first power inlet-line cabinet 2311, and the second power source 412 is connected to a circuit in the second power inlet-line cabinet 2312. In actual operation, there may be the following situations: (1) only the first power source 411 works normally, and the second power source 412 is in a non-working state; (2) only the second power source 412 works normally, and the first power supply 411 is in a non-working state.

Figure 7:
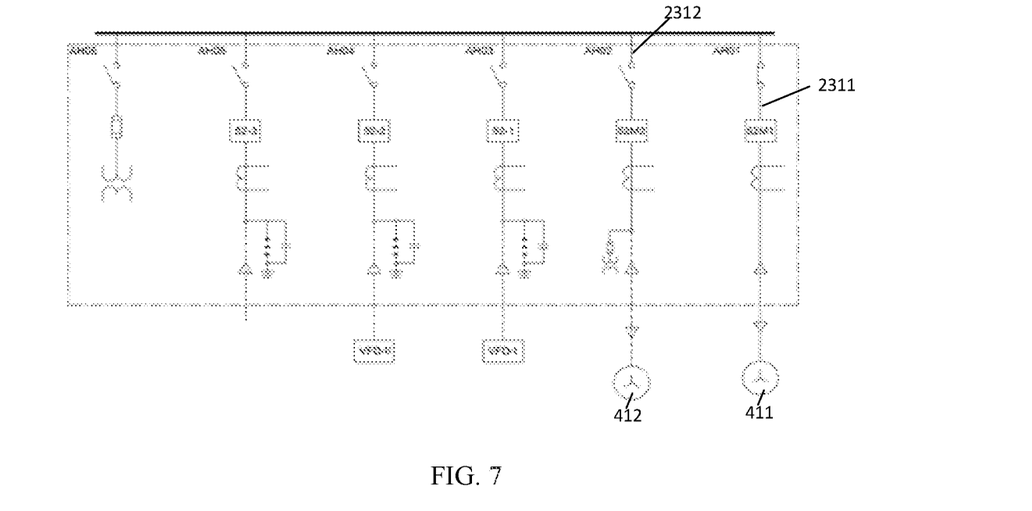
FIG. 7 is a schematic diagram of only the first power source supplying power provided by an embodiment of the present disclosure.
Figure 8:
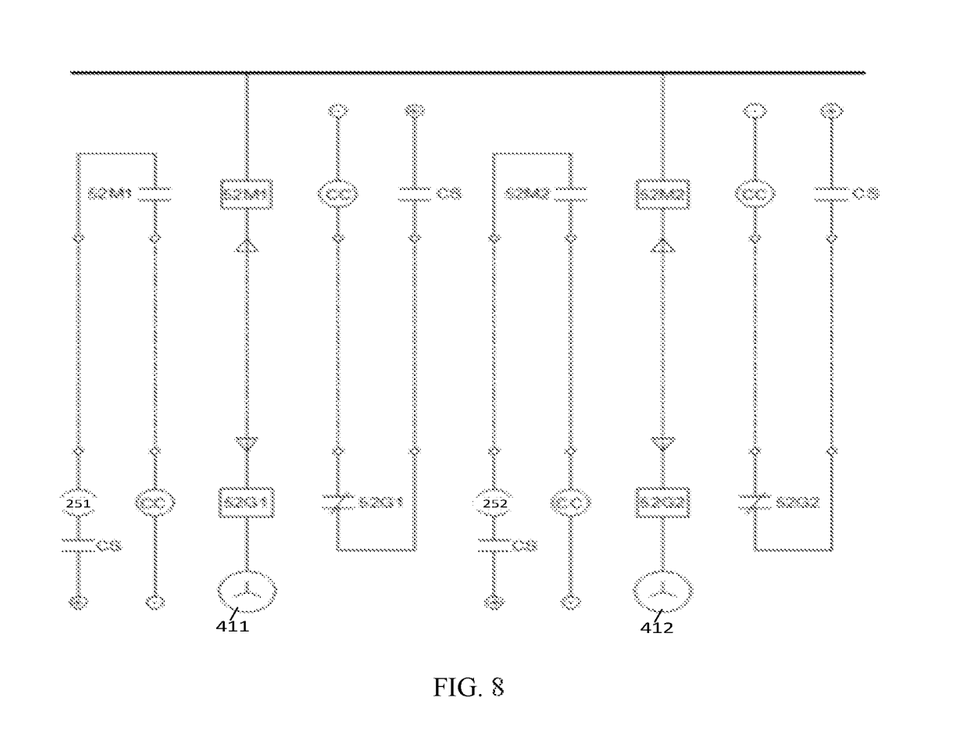
FIG. 8 is a schematic diagram of electrical interlocking provided by an embodiment of the present disclosure.

For example, FIG. 7 is a schematic diagram of only the first power source supplying power provided by an embodiment of the present disclosure. As shown in FIG. 7, the first power source 411 is connected with the circuit in the first power inlet-line cabinet 2311 to achieve electrical connection, and the second power source 412 is not connected with the circuit in the second power inlet-line cabinet 2312, so that only the first power source 411 provides the external power. FIG. 8 is a schematic diagram of electrical interlocking provided by an embodiment of the present disclosure. For example, as shown in FIG. 7 and FIG. 8, the closing and power transmission process of only the first power source 411 operating is: allowing the first generator outlet switch 52G1 to be in an open state, closing the first power inlet-line circuit breaker 52M1, and then closing the first generator outlet switch 52G1 synchronously through the first synchronous device 251.

Figure 9:
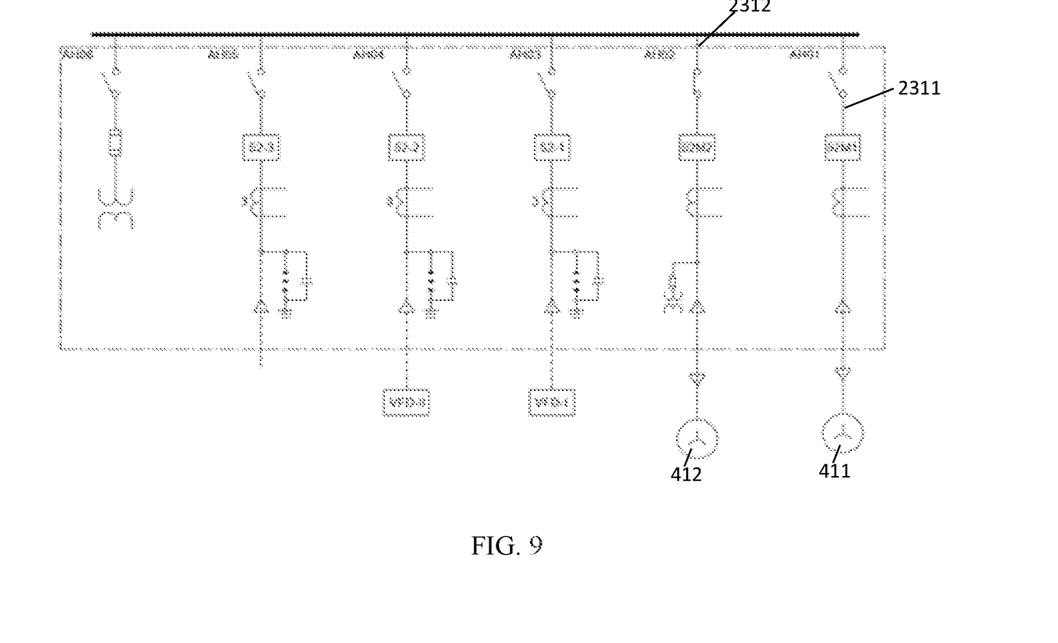
FIG. 9 is a schematic diagram of only the second power source supplying power provided by an embodiment of the present disclosure.

For example, FIG. 9 is a schematic diagram of only the second power source supplying power provided by an embodiment of the present disclosure. As shown in FIG. 9, for the case that only the second power source 412 works normally and the first power source 411 is in the non-working state, the second power source 414 is connected with the circuit in the second power inlet-line cabinet 2312 to achieve electrical connection, and the first power source 411 is not connected with the circuit in the first power inlet-line cabinet 2311, so that only the second power source 412 provides the external power. Similarly, as shown in FIG. 8 and FIG. 9, the closing and power transmission process of only the second power source 412 operating is: allowing the second generator outlet switch 52G2 to be in an open state, closing the second power inlet-line circuit breaker 52M2, and then closing the second generator outlet switch 52G2 synchronously through the second synchronous device 252.

If the working power source (the first power source 411 or the second power source 412) stops working suddenly, it will switch to another power source which is not in a working state quickly to ensure the normal shutdown or normal operation of the tasks.

Figure 10:
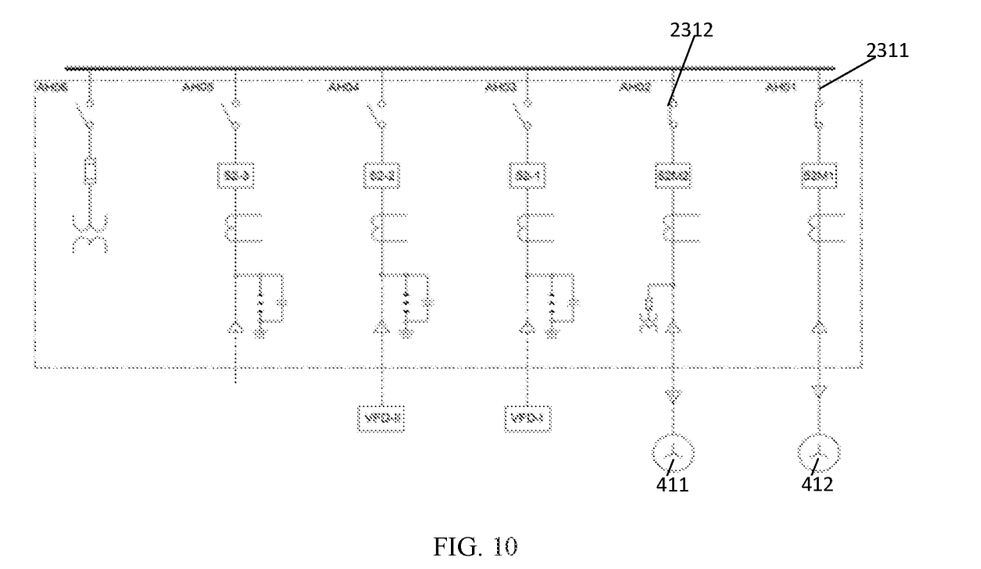
FIG. 10 is a schematic diagram of the first power source and the second power source supplying power together provided by an embodiment of the present disclosure.

In the actual operation, there may be poor working conditions. If the capacity of any one of the first power source 411 and the second power source 412 can not meet the operation requirements of the site, it is necessary to quickly use the first power source 411 and the second power source 412 in parallel, and the parallel first power source 411 and the second power source 412 supply power to the load equipment together to meet the requirements of power supply. FIG. 10 is a schematic diagram of the first power source and the second power source supplying power together provided by an embodiment of the present disclosure, because of the irreversible damage to the first power source 411 and the second power source 412 caused by a short circuit fault of asynchronous parallel closing, the synchronous parallel closing of the first power source 411 and the second power source 412 can be realized through the electrical interlocking between the first power inlet-line cabinet 2311 and the second power inlet-line cabinet 2312 in the switchgear room 23, so as to prevent the occurrence of asynchronous parallel closing. For example, as shown in FIG. 8 and FIG. 10, the synchronous parallel closing and power transmission process of the first power source 411 and the second power source 412 is: connecting a close state of the first power inlet-line circuit breaker 52M1 in series with a close circuit of the first generator outlet switch 52G1, and connecting an open state of the first generator outlet switch 52G1 in series with a close circuit of the first power inlet-line circuit breaker 52M1; and connecting a close state of the second power inlet-line circuit breaker 52M2 in series with a close circuit of the second generator outlet switch 52G2, and connecting an open state of the second generator outlet switch 52G2 in series with a close circuit of the second power inlet-line circuit breaker 52M2. Such electrical interlocking circuit ensures the reliability of operation sequence.

In actual operation, the following situations may occur: (1) the first power source 411 stops working suddenly when both the first power source 411 and the second power source 412 are working normally; (2) the second power source 412 stops working suddenly when both the first power source 411 and the second power source 412 are working normally.

For example, referring to FIG. 8, for the above situation (1), the following process will occur: performing a protection fault action to jump the first power inlet-line circuit breaker 52M1 first, after the fault is resolved, allowing the first power source 411 to be parallel to a bus line of the power distribution device, separating the first generator outlet switch 52G1, and then closing the first power inlet-line circuit breaker 52M1, and through the detection of the first synchronization device 251, when meeting the parallel synchronization condition, point closing the first generator outlet switch 52G1; or, performing a protection fault action to jump the first generator outlet switch 52G1, after the fault is resolved, allowing the first power source 411 to be parallel to a bus line of the power distribution device, and through the detection of the first synchronization device 251, when meeting the parallel synchronization condition, closing the first generator outlet switch 52G1.

For example, referring to FIG. 8, for the above situation (2), the following process will occur: performing a protection fault action to jump the second power inlet-line circuit breaker 52M2, after the fault is resolved, allowing the second power source 412 to be parallel to a bus line of the power distribution device, separating the second generator outlet switch 52G2 first, then closing the second power inlet-line circuit breaker 52M2, and through the detection of the second synchronization device 252, when meeting the parallel synchronization condition, closing the second generator outlet switch 52G2; or, performing a protection fault action to jump the second generator outlet switch 52G2, after the fault is resolved, allowing the second power source 412 to be parallel to a bus line of the power distribution device, and through the detection of the second synchronization device 252, when meeting the parallel synchronization condition, closing the second generator outlet switch 52G2.

Figure 11:
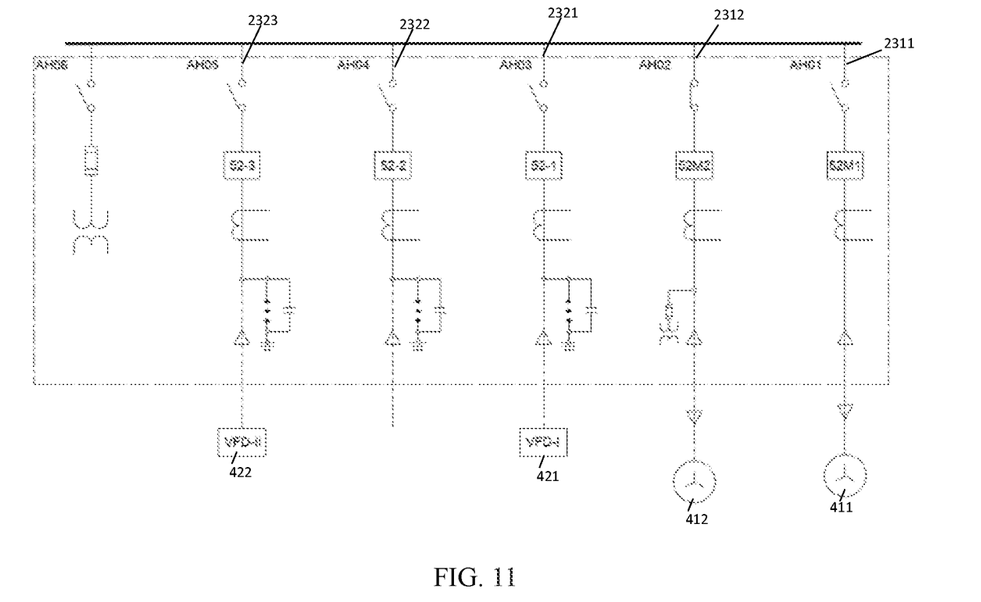
FIG. 11 is a schematic diagram of transferring a load feed outlet-line cabinet to another load feed outlet-line cabinet in a case of failure provided by an embodiment of the present disclosure.

FIG. 11 is a schematic diagram of transferring a load feed outlet-line cabinet to another load feed outlet-line cabinet in a case of failure provided by an embodiment of the present disclosure. The first load equipment 421 is connected to a circuit in the first load feed outlet-line cabinet 2321, and the second load equipment 422 is connected to a circuit in the second load feed outlet-line cabinet 2322, and the third load feed outlet-line cabinet 2323 is a spare load feed outlet-line cabinet. When the first load feed outlet-line cabinet 2321 has a fault, the first load equipment 421 will be connected with the circuit in the third load feed outlet-line cabinet 2323, or, when the second load feed outlet-line cabinet 2322 has a fault, the second load equipment 422 will be connected with the circuit in the third load feed outlet-line cabinet 2323. The bus-line voltage mutual inductor cabinet 233 also has a circuit.

For example, the power inlet-line cabinet 231 (including the first power inlet-line cabinet 2311 and the second power inlet-line cabinet 2312) and the load feed outlet-line cabinet 232 (including the first load feed outlet-line cabinet 2321, the second load feed outlet-line cabinet 2322 and the third load feed outlet-line cabinet 2323) are equipped with protection relays, and the bus-line voltage mutual inductor cabinet 233 provides voltage signals to the protection relays of the power inlet-line cabinet 231 and the protection relays of the load feed outlet-line cabinet 232. The current signals required by the protection relays come from the current mutual inductors in the power inlet-line cabinet 231 and the load feed outlet-line cabinet 232, and the voltage signals come from the bus-line voltage mutual inductor. The protection relays 31 judge whether the corresponding circuit is normal by detecting the normal state or the abnormal state of the incoming current and voltage signal. In a case of failure, the protection relays 31 send out a tripping signal to open the circuit breaker, thus cutting off the fault circuit, ensuring the normal operation of the non-fault circuit or preventing the expansion of the accident scope, so as to protect the connecting equipment.

The power distribution device, the power distribution trailer, the electric drive system and the operation method of the electric drive system provided by the embodiments of the present disclosure has at least one of the following beneficial effects:

(1) In the power distribution device provided by at least one embodiment of the present disclosure, the T-type cable connector is changed to an ordinary cable crimping copper bar, the gas insulated switch cabinet is matched with the cable crimping copper bar, and then the ordinary cold shrinkable terminal connector can be combined with the cable crimping copper bar, so as to finally realize the connection of the external device to the gas insulated switch cabinet through the cold shrinkable terminal connector, and to solve the problem of coating grease when plugging in and plugging out of the T-type connector in the well site, having high requirements for environmental cleanliness, having difficulties to be fixed and being easy to be damaged during transportation.

(2) The power distribution device provided by at least one embodiment of the present disclosure can ensure that the cable on the inlet-line side of the external power source will not pass through the bottom of the power distribution device according to the change of the position of the external power source, so as to shorten the length of the cable, better realize the electrical connection, and enable the power distribution device to be placed stably.

(3) In the power distribution device provided by at least one embodiment of the present disclosure, the starting power source, the first power inlet-line cabinet and the second power inlet-line cabinet are sequentially adjacent to each other, which can shorten the length of the cable.

(4) In the distribution device provided by at least one embodiment of the present disclosure, when the external power source has a fault, the starting power source can provide power to the auxiliary machines such as ventilation and lubricating oil system, so as to serve as a spare power source.

(5) The power distribution trailer provided by at least one embodiment of the present disclosure can be moved and applied to the field of electric drive fracturing site or the oil field well site for electrification operation.

The following statements should be noted.

(1) The accompanying drawings involve only the structure(s) in connection with the embodiment(s) of the present disclosure, and other structure(s) can be referred to common design(s).

(2) For the purpose of clarity, in accompanying drawings for illustrating the embodiment(s) of the present disclosure, the thickness of a layer or a region may be enlarged or narrowed, that is, the drawings are not drawn in a real scale.

(3) In case of no conflict, features in one embodiment or in different embodiments can be combined to obtain new embodiments.

What have been described above are only specific implementations of the present disclosure, the protection scope of the present disclosure is not limited thereto, and the protection scope of the present disclosure should be based on the protection scope of the claims.

What is claimed is:

1. A power distribution device, comprising: a starting power source, a switchgear room, and a tool room sequentially arranged along a first direction, wherein:
    the switchgear room comprises a power inlet-line cabinet and a load feed outlet-line cabinet that are sequentially arranged along the first direction;
    at least one of the power inlet-line cabinet and the load feed outlet-line cabinet is a gas insulated switch cabinet, and a cable terminal of at least one gas insulated switch cabinet is provided with a cable crimping copper bar.

2. The power distribution device according to claim 1, wherein the power inlet-line cabinet comprises a first power inlet-line cabinet and a second power inlet-line cabinet; and the load feed outlet-line cabinet comprises a first load feed outlet-line cabinet, a second load feed outlet-line cabinet, and a third load feed outlet-line cabinet.

3. The power distribution device according to claim 2, wherein the first power inlet-line cabinet is the gas insulated switch cabinet, a cable terminal of the first power inlet-line cabinet comprises a first cable terminal and a second cable terminal that are arranged oppositely along a second direction, the first power inlet-line cabinet is configured to be connected to a first power source through the first cable terminal or the second cable terminal, and the second direction is parallel to a plane where the switchgear room is located and is perpendicular to the first direction.

4. The power distribution device according to claim 3, wherein at least one of the first cable terminal and the second cable terminal is provided with the cable crimping copper bar, and the first power inlet-line cabinet is configured to be electrically connected to the first power source through the cable crimping copper bar.

5. The power distribution device according to claim 3, wherein the second power inlet-line cabinet is the gas insulated switch cabinet, and a cable terminal of the second power inlet-line cabinet comprises a third cable terminal and a fourth cable terminal that are arranged oppositely along the second direction, the second power inlet-line cabinet is configured to be connected to a second power source through the third cable terminal or the fourth cable terminal.

6. The power distribution device according to claim 5, wherein at least one of the third cable terminal and the fourth cable terminal is provided with the cable crimping copper bar, and the second power inlet-line cabinet is configured to be electrically connected to the second power source through the cable crimping copper bar.

7. The power distribution device according to claim 5, wherein:
    each of the first load feed outlet-line cabinet, the second load teed outlet-line cabinet, the third load feed outlet-line cabinet is the gas insulated switch cabinet;
    each of a cable terminal of the first load feed outlet-line cabinet, a cable terminal of the second load feed outlet-line cabinet, and a cable terminal of the third load feed outlet-line cabinet is provided with the cable crimping copper bar, and is configured to be electrically connected to a load equipment through the cable crimping copper bar.

8. The power distribution device according to claim 1, further comprising at least one of a temperature adjustment component and an alarm component in the switchgear room, wherein:
    the temperature adjustment component is configured to adjust temperature of the switchgear room; and
    the alarm component is configured to generate an alarm signal in a case where a fire occurs.

9. The power distribution device according to claim 1, wherein the tool room is a cable storage room, the cable storage room has a plurality of cables and a cable reel, the plurality of cables are on a same cable reel, the cable reel is provided with a partition, the partition separates the plurality of cables, and fixes a cable terminal of each of the plurality of cables.

10. The power distribution device according to claim 1, further comprising a bus-line voltage mutual inductor cabinet, wherein the power inlet-line cabinet and the load feed outlet-line cabinet are both provided with a protection relay, and the bus-line voltage mutual inductor cabinet is configured to provide voltage signals to the protection relays of the power inlet-line cabinet and the load feed outlet-line cabinet.

11. A power distribution trailer, comprising: the power distribution device according to claim 1 and a movable trailer, wherein the power distribution device is on a bearing surface of the movable trailer.

12. An electric drive system, comprising the power distribution trailer according to claim 11, a first power source, and a load equipment, wherein the first power source is on a first side surface of the power distribution trailer, and the load equipment is on a second side surface of the distribution trailer, the first side surface and the second side surface are opposite surfaces.

13. The power distribution device according to claim 12, further comprising a second power source, wherein the second power source is on the movable trailer and on a side of the starting power source away from the switchgear room.

14. The power distribution device according to claim 12, wherein the load equipment comprises an electric drive fracturing equipment.

15. An operation method of the electric drive system according to claim 12, wherein:
    the electric drive system further comprises a second power source, and the power inlet-line cabinet comprises a first power inlet-line cabinet connected to the first power source, and a second power source inlet-line cabinet connected to the second power source, the first power source comprises a first generator outlet switch and a first synchronization device, the first power inlet-line cabinet comprises a first power inlet-line circuit breaker, and the second power source comprises a second generator outlet switch and a second synchronization device, and the second power inlet-line cabinet comprises a second power inlet-line circuit breaker,
    the operation method comprises: allowing at least one of the first power source and the second power to operate, in a case where only the first power source operates: allowing the first generator outlet switch to be in an open state, closing the first power inlet-line circuit breaker, and then closing the first generator outlet switch synchronously through the first synchronous device.

16. The operation method according to claim 15, wherein in a case where only the second power source operates: allowing the second generator outlet switch to be in an open state, closing the second power inlet-line circuit breaker, and then closing the second generator outlet switch synchronously through the second synchronous device.

17. The operation method according to claim 15, wherein in a case where both the first power source and the second power source operate:
  connecting a close state of the first power inlet-line circuit breaker in series with a close circuit of the first generator outlet switch, and connecting an open state of the first generator outlet switch in series with a close circuit of the first power inlet-line circuit breaker; and
  connecting a close state of the second power inlet-line circuit breaker in series with a close circuit of the second generator outlet switch, and connecting an open state of the second generator outlet switch in series with a close circuit of the second power inlet-line circuit breaker.

18. The operation method according to claim 17, wherein in a case where both the first power source and the second power source operate normally, and the first power source suddenly stops operating:
  performing a protection fault action to jump the first power inlet-line circuit breaker first; after the fault is resolved, allowing the first power source to be parallel to a bus line of the power distribution device, separating the first generator outlet switch, closing the first power inlet-line circuit breaker, and closing the first generator outlet switch synchronously through the first synchronization device; or,
  performing a protection fault action to jump the first generator outlet switch; after the fault is resolved, allowing the first power source to be parallel to a bus line of the power distribution device, and closing the first generator outlet switch synchronously through the first synchronization device.

19. The operation method according to claim 17, wherein in a case where both the first power source and the second power source operate normally, and the second power source suddenly stops operating:
  performing a protection fault action to jump the second power inlet-line circuit breaker first; after the fault is resolved, allowing the second power source to be parallel to a bus line of the power distribution device, separating the second generator outlet switch, closing the second power inlet-line circuit breaker, and closing the second generator outlet switch synchronously through the second synchronization device; or,
  performing a protection fault action to jump the second generator outlet switch; after the fault is resolved, allowing the second power source to be parallel to a bus line of the power distribution device, and closing the second generator outlet switch synchronously through the second synchronization device.

20. The operation method according to claim 15, wherein:
  the load equipment comprises a first load equipment and a second load equipment, and the load feed outlet-line cabinet comprises a first load feed outlet-line cabinet, a second load teed outlet-line cabinet, and a third load feed outlet-line cabinet; the first load equipment is connected to a circuit in the first load feed outlet-line cabinet, the second load device is connected to a circuit in the second load feed outlet-line cabinet, and the third load feed outlet-line cabinet is a spare load feed outlet-line cabinet,
  in a case where the first load feed outlet-line cabinet has a fault, the first load equipment is connected to a circuit in the third load feed outlet-line cabinet; or,
  in a case where the second load feed outlet-line cabinet has a fault, the second load equipment is connected to the circuit in the third load feed outlet-line cabinet.

* * * * *